United States Patent [19]
Stone et al.

[11] Patent Number: 5,899,071
[45] Date of Patent: May 4, 1999

[54] ADAPTIVE THERMAL CONTROLLER FOR HEAT ENGINES

[75] Inventors: Kenneth W Stone, Huntington Beach, Calif.; Roy E. McAlister, Tempe, Ariz.

[73] Assignee: McDonnell Douglas Corporation, St. Louis, Mo.

[21] Appl. No.: 08/700,577

[22] Filed: Aug. 14, 1996

[51] Int. Cl.⁶ ..................................................... F03G 6/00
[52] U.S. Cl. .............................. 60/641.8; 60/515; 60/524
[58] Field of Search ............................. 60/641.8, 641.13, 60/641.14, 641.15, 644.1, 515, 524, 652, 661; 126/696

[56] References Cited

U.S. PATENT DOCUMENTS

| | | |
|---|---|---|
| 2,826,395 | 3/1958 | Petty . |
| 4,165,616 | 8/1979 | Pierpoline . |
| 4,249,386 | 2/1981 | Smith et al. . |
| 4,408,595 | 10/1983 | Broyles et al. ......................... 126/696 |
| 4,642,992 | 2/1987 | Julovich ..................................... 60/661 |
| 4,768,341 | 9/1988 | Nozaki et al. . |
| 5,010,734 | 4/1991 | Ho . |
| 5,228,293 | 7/1993 | Vitale . |

OTHER PUBLICATIONS

Charles W. Lopez, Kenneth W. Stone; Contractor Report; *Performance of the Southern California Edison Company Stirling Dish*; Oct., 1993.

*Primary Examiner*—Noah P. Kamen
*Attorney, Agent, or Firm*—Alston & Bird LLP

[57] ABSTRACT

A solar to mechanical or electric power conversion system which has a controller that varies the speed of a cooling fan and cooling fluid pump fan in accordance with the available solar energy intensity, ambient temperature surrounding the system and other operating conditions. The system includes a suitable heat source such as an isotope heat source, fuel combustor, or a solar concentrator that delivers solar energy to a focal point by reflection from mirrors or by Fresnel lens. A suitable solar concentrator may also be based upon on densifying the solar photon count by a Winston concentrator. For solar heated devices based on concentrated solar energy, a receiver is located at the focal point. This receiver is heated by concentrated solar energy. Heat is transferred to a working fluid which powers a heat engine. The heat engine converts the thermal energy into mechanical energy. The mechanical energy is transmitted to a load coupled to the engine. The temperature of the working fluid is lowered by transfer to the surroundings by operation of means selected from the group including a cooling fluid valve means, variable rate fan, a variable rate pump, a cooling fluid to air heat exchanger, a cooling fluid to ground heat exchanger, and a change of phase heat exchanger. The speed of the fan and pump are controlled by a controller which also senses the ambient temperatures that are available and the temperature of the cooling fluid. The controller computes an optimum cooling fluid temperature as a function of energy expenditure and controls fan, valve, and pump operations to achieve the desired energy conversion optimization.

27 Claims, 4 Drawing Sheets

U.S. Patent    May 4, 1999    Sheet 1 of 4    5,899,071
FIG. 1.
(PRIOR ART)
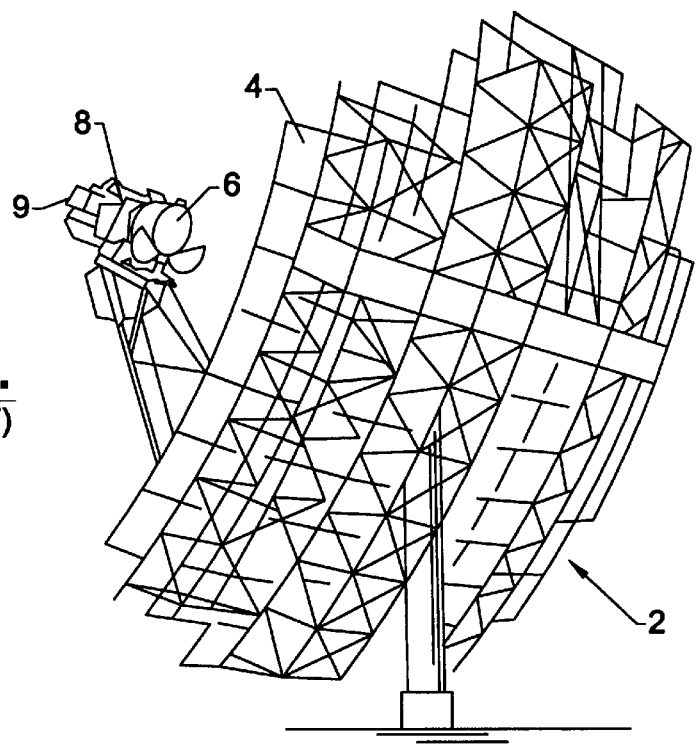
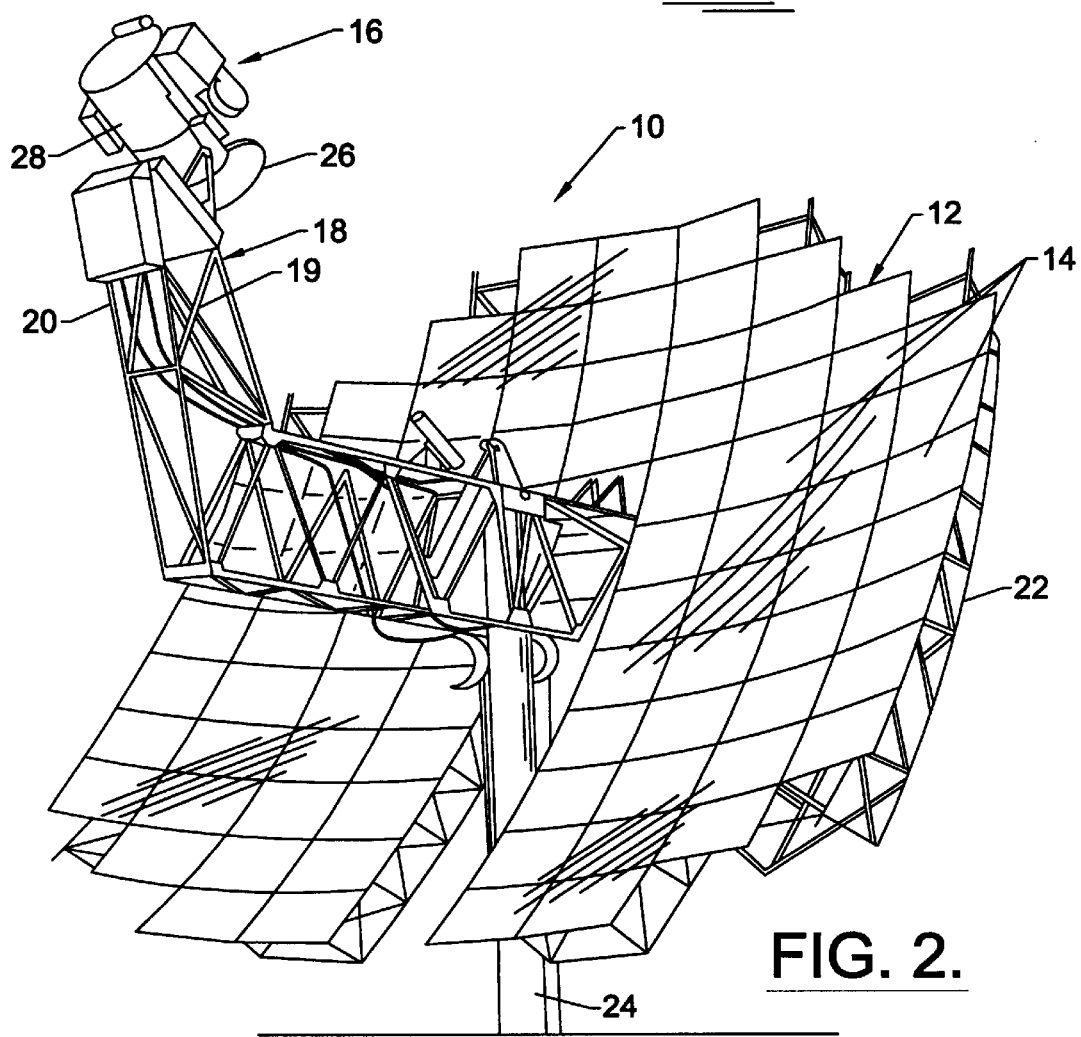
FIG. 2.

ADAPTIVE THERMAL CONTROLLER FOR HEAT ENGINES

BACKGROUND OF THE INVENTION

1. Field of the Invention

This invention relates to a power system that converts heat energy into motive work.

2. Background of the Invention

The Industrial Revolution has been fueled with petrocarbons such as coal, oil and natural gas. From the time of earliest records to the middle 1600's, human population grew at a very slow rate. Since about 1650, startling increases in human population have closely followed the exploitation of resources such as petrocarbons, metallic ores, water, and air. The fossil equivalent of some 180 million barrels of oil are burned each day by earth's human population. At the beginning of the 21st century, earth's population will reach six billion persons which doubles the 1960 population.

For millions of years, fossil deposits provided safe and natural storage of carbon and radioactive elements. Global combustion of 2,800 million tons of coal each year releases about 10,200 tons of carbon dioxide, 8,960 tons of thorium and 3,640 tons of uranium to the air, water, and food chain.

Burning the fossil equivalent of 180 million barrels of oil per day has polluted the global atmosphere with carbon dioxide and other objectionable emissions. The present concentration of carbon dioxide in the atmosphere is about 25 to 30% greater than at any time in the last 160,000 years. This increased presence of carbon dioxide traps solar energy in the atmosphere. Because more energy is trapped in the atmosphere, there is more evaporation of the oceans. This results in more extreme weather-related events such as floods, hurricanes, and tornados. Combustion of fossil fuels for generation of electricity exceeds all other sources of carbon dioxide pollution by the machines of the Industrial Revolution.

The market for electricity exceeds seven hundred billion dollars annually and is expected to reach one trillion dollars early in the 21st century. Generation of electricity to meet this demand must utilize renewable resources in order to prevent catastrophic degradation of the environment by fossil fuel combustion. Solar energy provides a vast but relatively untapped source of dependable energy. There have been developed various alternate fuel power systems that convert heat, wind, solar energy, etc. into electrical power. FIG. 1 shows a solar conversion system of the prior art. The system includes a solar reflector 2 which has a plurality of mirrors 4 that reflect sunlight to a focal point. Located at the focal point is a receiver 6 which is heated by concentrated solar energy. The heat is transferred to a working fluid that flows into a heat engine such as a Stirling engine 8. The Stirling engine 8 converts the thermal energy into mechanical energy. This mechanical energy is converted into electrical power by a suitable generator 9 that is coupled to the engine 8. The working fluid flows through a heat exchanger that is cooled by a suitable fluid of a cooling system. The cooling fluid flows through a radiator heat exchanger that is cooled by air that is delivered to the heat exchanger by a fan.

The electrical power generated by this type of conversion system is typically provided to a municipal power line, an off grid application such as a remote town, or a single farm or family unit. To be commercially competitive, the cost per unit energy produced by the system must be comparable to conventional power systems. The cost per unit of energy is a direct function of the energy efficiency of the system. In general, the system will have a lower cost per energy unit with a higher energy efficiency. Therefore it is desirable to maximize the net energy efficiency of the conversion system which is generated energy less parmetrics energy.

The efficiency of a heat engine such as a Stirling engine is generally defined by the equation B(Th−Tc)/Th, where Th is the upper working temperature, Tc is the lower working temperature and B is an efficiency factor of the engine that takes into account other losses. As shown by the equation, the efficiency can be increased by decreasing the lower temperature of the fluid. This is typically accomplished by increasing the heat transfer rate of the cooling system. The lower fluid temperature is limited by the ambient air temperature and amount of power drawn by the fan to cool the working fluid. At some point more energy is consumed cooling the working fluid than is gained by the system. For this reason, solar conversion systems are typically designed to operate at optimum pre-set cooling fluid temperatures.

To conserve energy, the radiator fan is de-energized when the cooling fluid is below the set point temperature. The fan is then energized when the fluid temperature raises to the set point temperature. The cycle of energizing and de-energizing the fan continues throughout the operation of the engine. The constant on-off cycling of the fan has numerous negative ramifications on the system. For example, energizing the fan initially requires a relatively large starting current which reduces the overall efficiency of the system. Periodic current surges also reduce the life of the fan. It would be desirable to provide a solar conversion system that minimized the power surges to the fan.

The system may have different optimum operating temperatures depending upon the temperature of the surrounding atmosphere and available solar energy. For example, the system may have one optimum lower fluid temperature when the ambient temperature is at 20° C. and a different optimum lower fluid temperature when the ambient temperature is at 40° C. Therefore a conversion system that has an optimum set point temperature for an ambient temperature of 40° C. may not operate at maximum efficiency when the ambient temperature is 20° C.

It would be highly desirable to have a solar energy conversion system which operates at maximum efficiency in varying ambient conditions.

SUMMARY OF THE INVENTION

The present invention is a solar to mechanical or electric power conversion system which has a controller that varies the speed of a cooling fan and cooling fluid pump fan in accordance with the available solar energy intensity, ambient temperature surrounding the system and other operating conditions as shown in FIG. 5, the system includes a suitable heat source such as an isotope heat source, fuel combustor, or a solar concentrator that delivers solar energy to a focal point by reflection from mirrors or by Fresnel lens. A suitable solar concentrator may also be based upon on densifying the solar photon count by a Winston concentrator. For solar heated devices based on concentrated solar energy, a receiver is located at the focal point. This receiver is heated by concentrated solar energy. The heat is transferred to a working fluid which powers a heat engine such as a Stirling engine. The Stirling engine converts the thermal energy into mechanical energy. The mechanical energy is delivered to a suitable load such as a compressor, a pump such as an irrigation or water well pump, linear alternator, or rotary generator. See FIG. 5. After performing work, the temperature of the working fluid is cooled by the cooling system to the optimum energy performance as determined by the operating conditions. The speed of the fan in the cooling system is controlled by a controller which senses the ambient temperature, generating power level, and the temperature of the cooling fluid. The controller computes an optimum cooling-fluid set point temperature and controls the fan speed to achieve the desired temperature. The optimum cooling fluid set point temperature maximizes annual net energy of the system.

The system may further have a heat removal reservoir that is preferably located in the base of a pedestal that supports the engine and, if present, the solar reflectors. The reservoir may be substantially located below the earth's surface. The ground provides a heat sink for the removal of heat from the system. The system may also have a plurality of frame pipes that support the Stirling engine and provide an additional heat exchanger for the cooling fluid.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of a solar energy conversion system of the prior art;

FIG. 2 is a perspective view of a solar energy conversion system of the present invention;

DETAILED DESCRIPTION OF THE INVENTION

Figure 3:
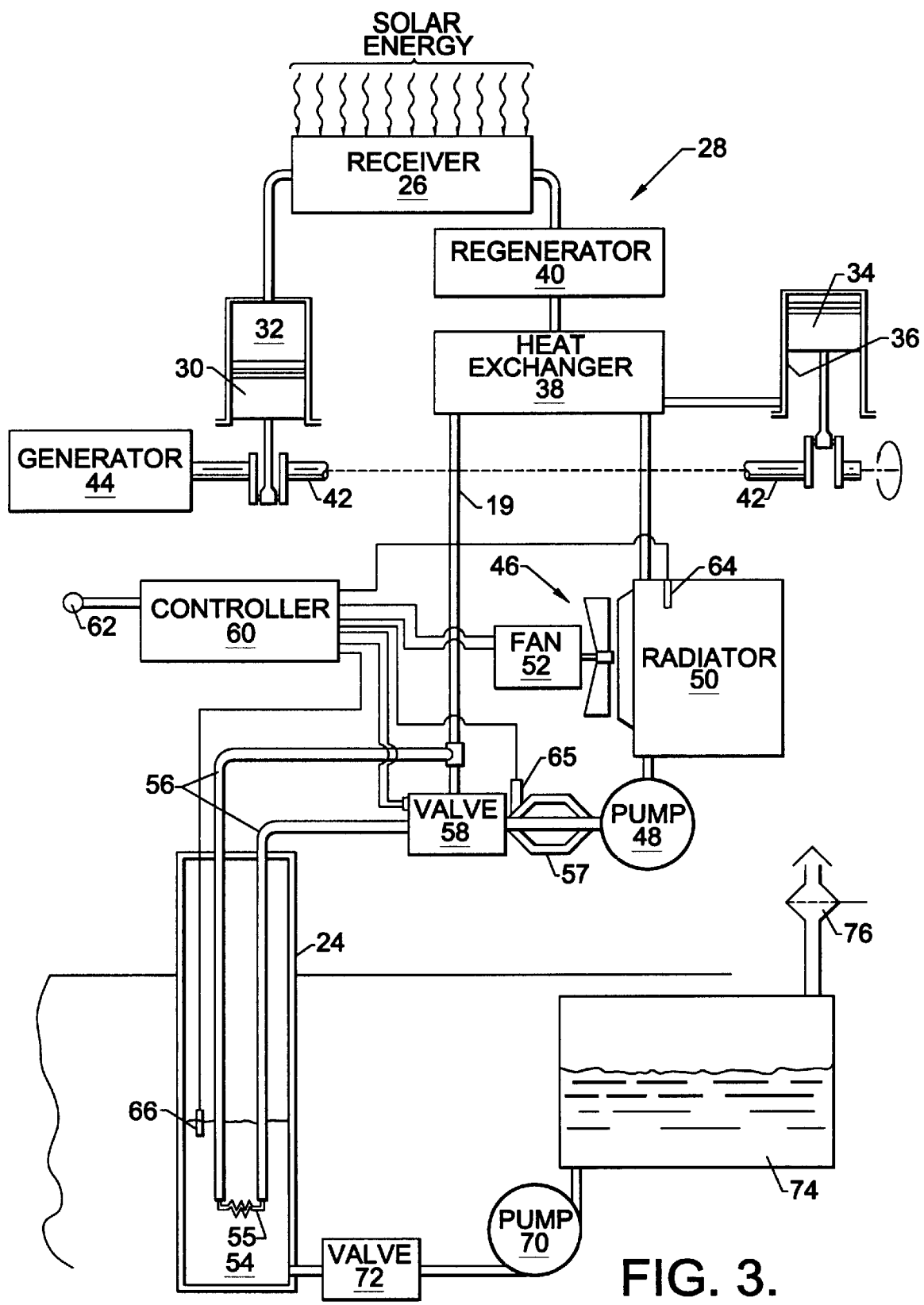
FIG. 3 is a schematic of the solar energy conversion system.

Referring to the drawings more particularly by reference numbers, FIG. 2 shows a solar energy conversion power system 10 of the present invention. The system 10 is generally used to convert solar energy into mechanical and/or electrical power. The power may be provided directly to a power distribution system (not shown).

The preferred system includes a solar reflector assembly 12 that has a plurality of mirrors 14. Mirrors 14 reflect solar energy to a single focal point. Located at the focal point is a heat engine such as a Stirling engine and generator assembly 16 which converts the solar energy into electrical power. The engine assembly 16 is supported by an engine frame 18. In the preferred embodiment, the engine frame 18 includes a plurality of pipes 20 that both support the engine and provide heat exchange capacity for a suitable cooling fluid that flows through the frame 18 and the engine 16. Cooling fluids such as mixtures of 50% water and 50% ethylene glycol with corrosion inhibitors typical found in commercially available "antifreeze" are suitable.

Mirrors 14 are supported by a mirror frame 22 that is suspended above the ground by a pedestal 24. Mirrors 14 are typically rotated by one or more motors (not shown) that tracks the movement of the sun. The engine assembly 16 includes a receiver 26 that is connected to a heat engine 28. Receiver 26 is located approximately at the focal point of the reflected solar energy. Receiver 26 typically has a plurality of coils (not shown) that are heated by the concentrated solar energy. Other types of receivers such as a boot boiler or heat pipe can be used. A working fluid flows through the coils of the receiver 26 and absorbs the heat provided by the solar energy. The working fluid is typically a hydrogen or helium gas.

Heat engine 28 may be any suitable engine such as the free-piston Stirling types, Brayton-cycle engines, Rankine-Cycle engines, Ericsson types or a kinematic Stirling as shown for purposes of illustration. As shown in FIG. 3, heat engine 28 has a first piston 30 located within a first piston chamber 32 that is in fluid communication with receiver 26. Engine 28 also has a second piston 34 located within a second piston chamber 36. The second piston chamber 36 is in fluid communication with a heat exchanger 38 and a regenerator 40. Pistons 30 and 34 are attached to a crankshaft 42 that is coupled to a suitable load such as an electrical generator 44.

An example of the operation for a Stirling cycle, the solar energy heats the working fluid within the receiver 26. The heated working fluid expands in the first piston chamber 32 and displaces the first piston 30. The movement of the first piston 30 rotates the crankshaft 42. Crankshaft rotary work is converted into electrical energy by generator 44.

Further rotation of the crankshaft 42 also moves the first piston 30 to contract the volume of the first chamber 32 and displaces the working fluid back through the receiver 26. Receiver 26 provides more energy to the working fluid which then flows into the regenerator 40. Regenerator 40 removes and stores heat from the working fluid. The temperature of the working fluid is further reduced by the heat exchanger 38 as the working fluid flows toward the second chamber 36. Crankshaft 40 moves the second piston 34 to decrease the volume of the second chamber 36. The reduction in the temperature of the working fluid allows the volume of the second chamber 36 to be reduced without a significant amount of work from the crankshaft 40. The movement of the second piston 34 displaces the working fluid back through heat exchanger 38 and regenerator 40. The working fluid recaptures the heat from the regenerator 40. The working fluid is further heated by the receiver 26 and expanded within the first chamber 32 to perform additional work and the cycle is repeated.

The Stirling engine assembly has a cooling system 46 that transfers the heat removed from the working fluid to the ambient air or soil. Cooling system 46 includes a pump 48 which circulates a cooling fluid through the heat exchanger 38. Heat exchanger 38 and pump 48 are connected to radiator 50. Radiator 50 is cooled by air which is circulated by a motor-driven fan 52. Heat is transferred from the working fluid to the cooling fluid within the heat exchanger 38, and then transferred from the cooling fluid to the ambient by the radiator 50 as a function of the air movement provided by motor-driven fan 52.

Cooling system 46 may include a heat removal reservoir 54 that is located within a base of the pedestal 24 which is preferably substantially submerged below the surface of the earth. Reservoir 54 is connected to the pump 48 and heat exchanger 38 by fluid lines 56. The ground surrounding the reservoir 54 generally provides a temperature that is the average year around temperature of the ambient air. Therefore, in hot ambient conditions, the ground provides a lower temperature than the ambient air. The ground can thus provide an advantageous medium for the removal of heat from the system. Under many conditions, using reservoir 54 as a heat sink improves the overall efficiency of the system. In many of the world's desert areas, the annual average temperature is less than 10° C. compared to day time high temperatures that often reach 50° C.

During the day when air temperatures peak, reservoir 54 is used to remove heat that is rejected by the heat engine. During the night reservoir 54 approaches the ground temperature which is the average annual temperature of the ambient air which is far less than the day-time high temperature for ambient air. Reservoir 54 can be sized to take advantage of these factors and greatly increase the overall efficiency of the system.

To further increase options for improving the efficiency of the system, parallel fluid lines 57 may be pipes integrally formed with the engine frame 18. The pipes are typically constructed from a suitable thermally conductive material that transfers heat from the cooling fluid to the ambient air. Sensor 65 measures the temperature of working fluid from fluid lines 57.

The flow of cooling fluid into the reservoir 54 is controlled by a valve 58 and controller 60 which is preferably a microcontroller. Cooling fluid is circulated into the reservoir 54 by selection of appropriate porting of the three-way valve 58. Controller 60 is connected to a temperature sensor 62 that senses the temperature of the ambient air and temperature sensor 64 that senses the temperature of the cooling fluid within the radiator. Controller 60 also monitors sensor 65 and sensor 66 located within reservoir 54. Controller 60 adaptively optimizes the operations of the invention as a function of solar intensity, wind velocity, wind direction, air temperature, reservoir heat dissipation rate, ground temperature, various markets for output power and the price structure for peak-shaving and stand-by demand compared to base-load energy. Because of variation in different ground conditions, the controller 60 determines the reservoir heat dissipation rate through prior performance data.

Controller 60 includes algorithms that optimizes the efficiency of the system by directing fluid flow through valve 58. For example, in hot ambient conditions, controller 60 may operate valve 58 to cause the cooling fluid from 50 to circulate into reservoir 54 or through a reservoir heat exchanger 55. It is generally preferred to utilize reservoir 54 as a pressurized container in which the pressure of a gas such as air in the space above the working liquid level as shown is the same as the pressure supplied by pump 48. In this instance, heat exchanger 55 does not need to be included in the cooling-fluid circuit.

In instances where it is desired to contain a large inventory of cooling medium in reservoir 54, it is preferred to utilize heat exchanger 55 to reduce the requirement for antifreeze in the radiator circuit and to use water or other lower cost mediums as the working fluid surrounding heat exchanger 55. This closed circuit heat exchanger arrangement also provides the opportunity for utilization of a change-of-phase medium in reservoir 54 in which the temperature of operation is constant during the time that two phases are present. Suitable solid to liquid change-of-phase mediums include Glauber's salt ($Na_2SO_4$-$10H_2O$) which melts at the constant temperature of about 31° C., sulfur trioxide which melts at 16.8° C., and sulfuric acid which melts at 10.5° C.

Suitable liquid to gas change-of-phase mediums include nitrogen dioxide which boils at 21.3° C., butadiene(1-,2-) which has a boiling point of about 18° C., and cyclo-butane which has a boiling point of about 120° C. $Na_2SO_4$-$10H_2O$ provides a constant-temperature, heat-removal capacity based upon heat-of-fusion principles that is about five times that of the single-phase use of water at ambient pressure for equal masses of medium.

Mediums with a lower phase-change temperature may be utilized in areas that have lower annual ambient air temperatures and correspondingly lower ground temperatures. Another approach is to change the temperature of the phase change for purposes of optimizing the overall energy conversion process.

In instances where it is desired to change the boiling point of the heat-sink medium around the heat exchanger 55, this can be accomplished by changing the pressure within the space above the liquid level in reservoir 54. To increase the boiling-point temperature, the pressure is increased over ambient. Gases suitable for increasing the pressure include air, nitrogen, and carbon dioxide. To reduce the boiling-point temperature, the pressure is reduced in comparison with the ambient. Illustratively, it is possible to use water as a split-phase heat-sink medium within reservoir 54 and to lower the boiling-point temperature by operating the space above the water at a partial vacuum. Utilization of liquid-vapor split phase cooling of coil 55 is especially advantageous because in addition to holding a constant temperature for heat sinking, it increases the heat-transfer area to the ground to include the entire internal area of reservoir 54 that is contacted by condensing vapors.

It is preferred to establish the desired vacuum by initially filling the internal volume of reservoir 54 with deairiated water and to pump water out of 24 and into reservoir which is vented through combination filter vent 76. Pump 70 is operated as needed by controller 60 until the desired vacuum and boiling-point of the water within reservoir 54 is established and indicated by sensor 66 which is preferably a combination of pressure and temperature sensors that are included as shown in the package of 66. Valve 72 prevents reentry of water until it is desired to change the boiling-point temperature. Reservoir tank 74 stores the inventory of removed water until it is desired to increase the boiling-point temperature by addition of water to 24.

It is preferred to assemble pump 70, valve 72, and tank 74 within pedestal 24 to facilitate field erection of a compact and rugged system, however, it is shown schematically as separately packaged components to illustrate the principles of operation.

By sufficiently evacuating the space above the liquid level, water can be made to boil at the desired temperature for purposes of optimizing the yield of energy from the invention with respect to the solar energy available, the air and ground temperatures, the thermal diffusivity from pedestal 24 to the ground, and the energy requirements to power pumps 48, 70, and fan 52. This enables the system to adaptively optimize net energy conversion over a broad range of ambient conditions.

In colder ambient conditions, the controller 60 may conserve pump energy by operating valve 58 to flow fluid from radiator 50 through pump 48 to cooling pipes 57 and back to heat exchanger 38 through line 19 as shown. It is preferred to insulate line 19 for the purpose of minimizing heat gain in instances that the working fluid has been cooled below the ambient air temperature by passage through reservoir 54. Fan 52 will be operated to reduce the temperature of the cooling fluid as needed depending upon ambient conditions, the temperature of reservoir 54, and the time of day that electricity from the system is most valuable. Controller 60 may operate valve 58 throughout the day to efficiently utilize the heat-removal capacity of reservoir 54.

In the preferred embodiment, the pump 48 and fan 52 have variable-rate motors that are controlled by the controller 60. Controller 60 contains an algorithm that varies the speeds of fan 52 and pump 48 to obtain an optimum operating cooling fluid temperature while expending the least amount of parasitic energy.

By way of example, a simplified algorithm for operation of fan drive 52 may be as follows:

$$Tco = Ta + (D^* Ta/C) + D^*(1-B)Th/B/C)^{1/2}$$

where;

Tco is the maximum operating temperature of the cooling fluid.

Ta is a measured ambient temperature.

Th is the upper working fluid temperature of the Stirling engine.

B is an engine coefficient for losses other than Carnot losses.

C is a generator efficiency coefficient.

D is a power consumption coefficient for the cooling fan.

Controller 60 varies the fan speed as a function of the ambient temperature. Generally speaking, the fan speed is increased if the ambient temperature goes up, and is decreased if the ambient temperature goes down. Variable speed pump 48 is similarly operated with allowances for pump efficiency factors.

Figure 4:
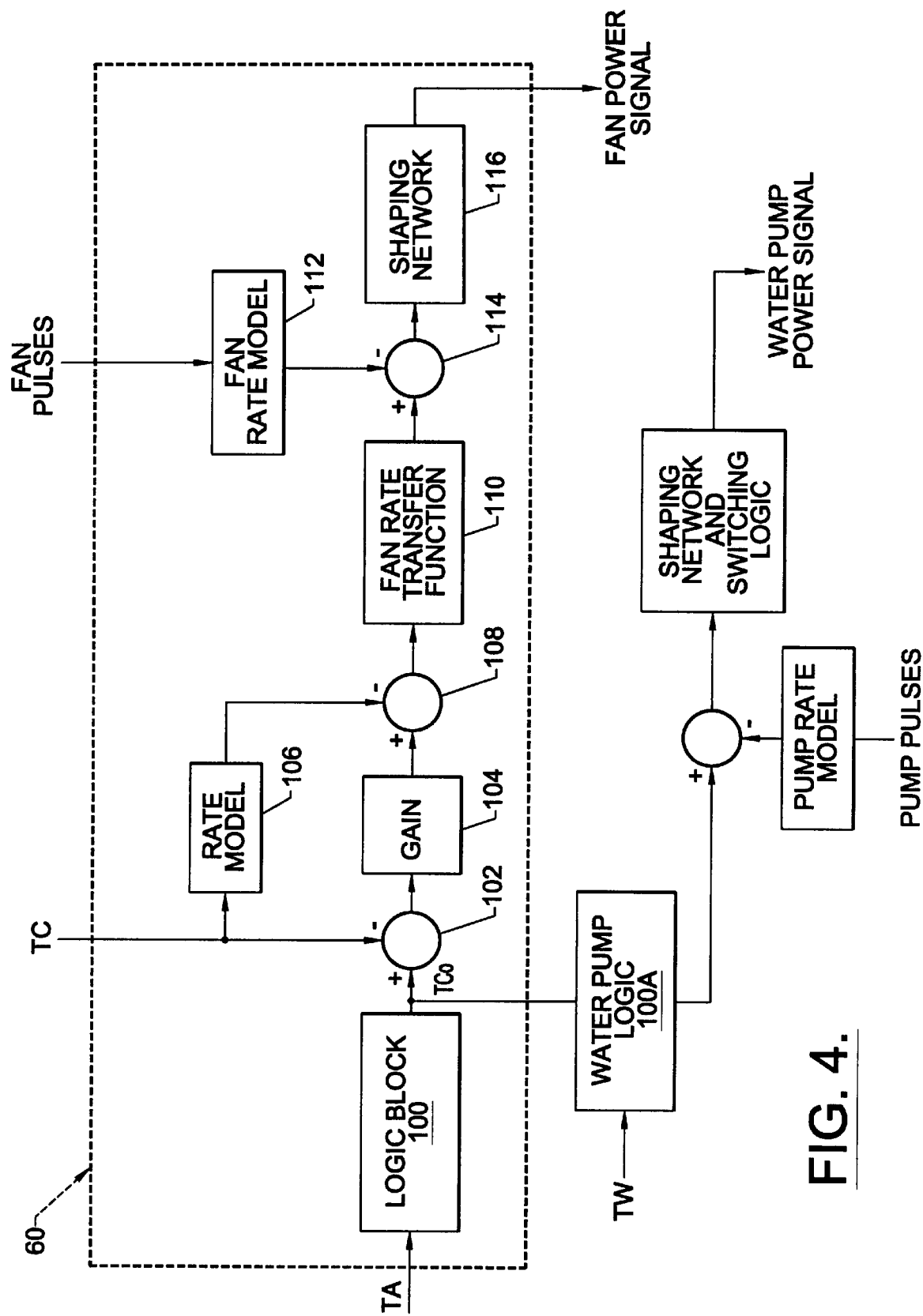
FIG. 4 is a schematic showing the control logic to vary the speed of a cooling fan and cooling fluid pump.
Figure 5:
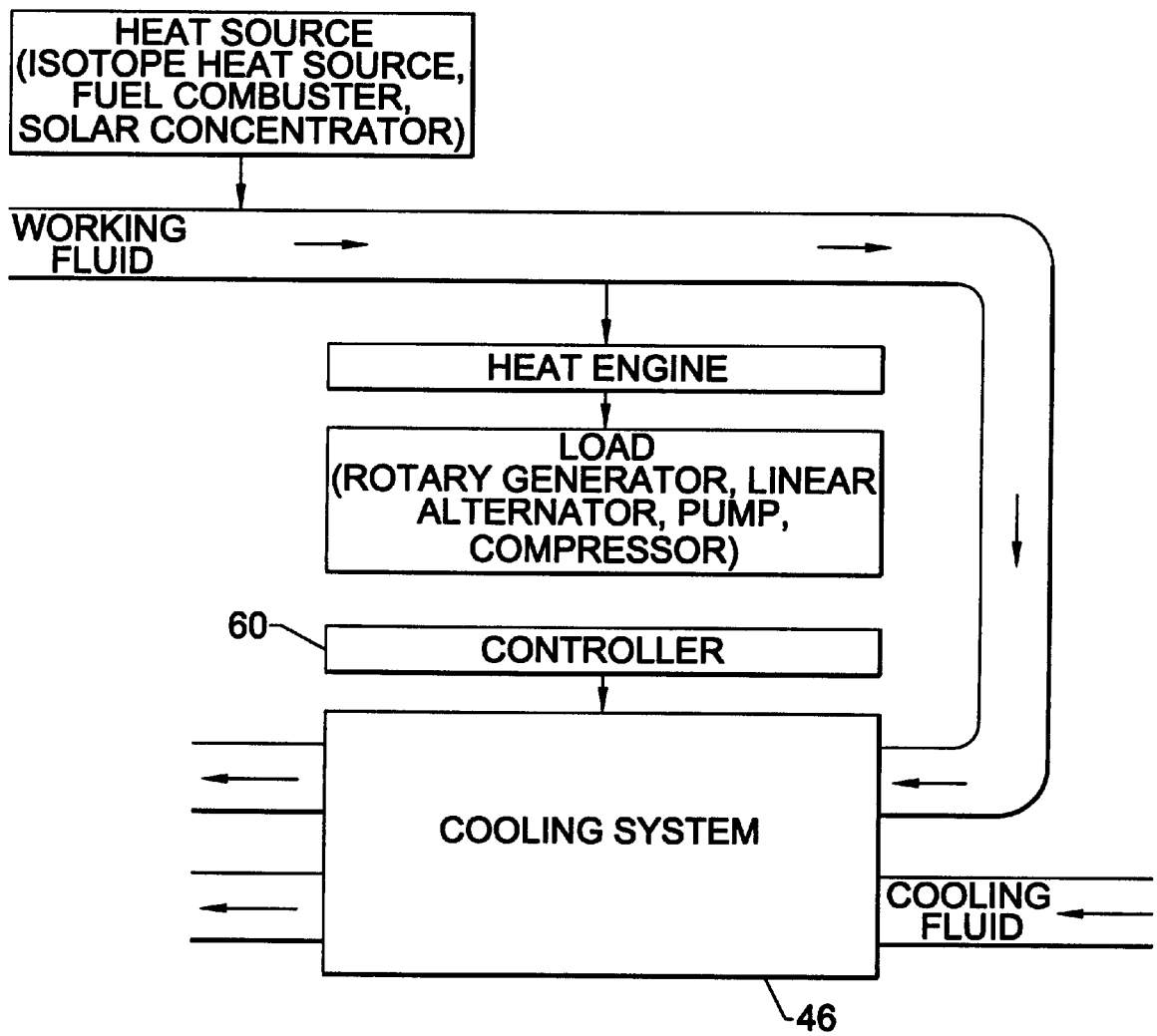
FIG. 5 is a block diagram view of a solar energy conversion system of one embodiment of the present invention.

As shown in FIG. 4, controller 60 calculates the optimum balance involving energy expenditures in fan 52 and pump 48 and the resulting cooling-fluid temperature in logic block 100. As an illustrative example, the optimum temperature is subtracted from the actual cooling fluid temperature by adder 102 to produce a temperature error signal. The error is multiplied by a gain in logic block 104. A time rate of change of the cooling temperature is computed in logic block 106 and subtracted from the error signal by adder 108. The final temperature error signal is converted into a commanded fan cooling rate in logic block 110. An actual fan rate is provided by block 112. The commanded fan rate is subtracted with an actual fan rate by adder 114 to obtain a fan error rate signal. The fan error rate signal is provided to a shaping network 116 which determines the speeds of fan 52. A similar adaptive control is utilized to control the energy expended by water pump 48 as shown in FIG. 4. If the actual cooling fluid temperature is below the optimum temperature the error signal will de-energize the fan to save energy. Controller 60 continually adjusts the fan speed to correlate with the ambient conditions to optimize the energy efficiency of the system. By way of example, the controller 60 will slow down the fan in conjunction with a decreasing ambient temperature.

Split-phase cooling allows the use of particularly advantageous algorithms for developing the greatest energy sales revenue from the system. If a week-day pattern of demand for electricity is evident followed by slack sales during the weekend this algorithm would provide for operations that shift the ratio of liquid/solid or vapor/liquid inventories to values on Friday that take the period of Saturday and Sunday to restore to week-day steady state ratio of liquid/solid or vapor/liquid required for one-night heat exchange to the ground around pedestal 24. Similarly if a higher rate is available for peak shaving the split-phase cooling would be utilized for maximizing revenues by operations that benefit from cyclic adjustment of the liquid/solid or vapor/liquid ratios in the heat sink medium contained within reservoir 54.

If the ambient temperature around cooling pipes 57 and radiator 50 is sufficiently low to cool the heat exchanger cooling fluid and the heat rejection requirement is small or moderate, fan 52 will not be operated. If the temperature of reservoir 54 is below the temperature at sensor 65, the energy expenditure of operating fan 52 will be compared to the potential increase in system efficiency and valve 58 will be operated to direct working fluid to reservoir 54 and from reservoir 54 to heat exchanger 38 through insulated pipe 19.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An electric power system, comprising:
   a solar conversion device which contains a working fluid that converts solar energy to mechanical energy;
   a generator that is coupled to said solar conversion device to convert the mechanical energy into an electrical power;
   a cooling system which has a cooling fluid that removes thermal energy from the working fluid; and,
   a controller that controls said cooling system to vary a temperature of the cooling fluid as a function of a plurality of operating conditions.

2. The system as recited in claim 1, wherein said cooling system includes a variable rate fan that has a speed which is controlled by said controller.

3. The system as recited in claim 1, wherein said solar conversion device includes a solar reflector that reflects the solar energy to a focal point, a receiver that is located at the focal point and which converts the solar energy to a thermal energy that is removed from the working fluid and a heat engine that is coupled to said receiver and said generator to convert the thermal energy of the working fluid into the mechanical energy.

4. The system as recited in claim 3, wherein said cooling system includes a heat removal reservoir located within a pedestal that supports said solar reflector, said reservoir being located below a ground surface.

5. The system as recited in claim 4, wherein said cooling system includes a heat exchanger connected to said heat engine and said reservoir.

6. The system as recited in claim 5, wherein a flow of cooling fluid through said reservoir and said heat exchanger is controlled by said controller.

7. The system as recited in claim 6, wherein said cooling system has a frame that supports said heat engine, said frame having a plurality of heat exchanging pipes that carry the cooling fluid.

8. An electric power system, comprising:
   a solar reflector that reflects solar energy to a focal point;
   a receiver located at the focal point of the reflected solar energy, said receiver converts the solar energy into a thermal energy that is transferred to a working fluid;
   a heat engine that is coupled to said receiver and which converts the thermal energy of the working fluid into a mechanical energy;
   a generator that is coupled to said heat engine and which converts the mechanical energy into an electrical power;
   a cooling system which has a cooling fluid that removes thermal energy from the working fluid; and
   a pedestal that supports said solar reflector, said pedestal contains a reservoir of a heat removal medium that is located below a ground surface for removing at least a portion of the thermal energy from the cooling fluid.

9. The system as recited in claim 8, further comprising a controller that controls said cooling system to vary a temperature of the cooling fluid as a function of an ambient temperature.

10. The system as recited in claim 9, wherein said cooling system includes a variable rate fan that has a speed which is controlled by said controller.

11. The system as recited in claim 10, wherein said cooling system includes a heat exchanger connected to said heat engine and said reservoir.

12. The system as recited in claim 11, wherein a flow of cooling fluid through said reservoir and said heat exchanger is controlled by said controller.

13. The system as recited in claim 12, wherein said cooling system has a frame that supports said heat engine, said frame having a plurality of heat exchanging pipes that carry the cooling fluid.

14. An electric power system, comprising:
   a solar reflector that reflects solar energy to a focal point;
   a receiver located at the focal point of the reflected solar energy, said receiver converts the solar energy into a thermal energy that is transferred to a working fluid;
   a heat engine that is coupled to said receiver and which converts the thermal energy of the working fluid into a mechanical energy;
   a generator that is coupled to said heat engine and which converts the mechanical energy into an electrical power;
   a frame that supports said heat engine, said frame having a plurality of heat exchanging pipes that carry a cooling fluid that removes thermal energy from the working fluid; and
   a controller that varies a temperature of the cooling fluid as a function of at least one operating condition.

15. The system as recited in claim 14, further comprising a heat exchanger connected to said heat engine and said frame.

16. The system as recited in claim 15, further comprising a variable rate fan which cools the cooling fluid and has a speed that is controlled by said controller.

17. The system as recited in claim 16, further comprising a heat removal reservoir located within a pedestal that supports said solar reflector, said reservoir being connected to said frame and located below a ground surface.

18. An electric power system, comprising:
   a solar reflector that reflects solar energy to a focal point;
   a receiver located at the focal point of the reflected solar energy, said receiver converts the solar energy into a thermal energy that is transferred to a working fluid;
   a heat engine that is coupled to said receiver and which converts the thermal energy of the working fluid into a mechanical power;
   a generator that is coupled to said heat engine and which converts the mechanical energy into an electrical power;
   a cooling system which has a cooling fluid that removes thermal energy from the working fluid;
   a variable rate fan which removes thermal energy from the cooling fluid, said variable rate fan operates at a speed; and,
   a controller that varies the speed of said variable rate fan as a function of an ambient temperature.

19. The system as recited in claim 18, wherein said cooling system includes a heat removal fluid reservoir located within a pedestal that supports said solar reflector, said reservoir being located below a ground surface.

20. The system as recited in claim 19, wherein said cooling system includes a heat exchanger connected to said heat engine and said reservoir.

21. The system as recited in claim 20, wherein a flow of cooling fluid through said reservoir and said heat exchanger is controlled by said controller.

22. The system as recited in claim 20, wherein said cooling system has a frame that supports said heat engine, said frame having a plurality of heat exchanging pipes that carry the cooling fluid.

23. An energy conversion system comprising:
   a heat source selected from the group consisting of an isotope heat source, a fuel combustor and a solar concentrator, wherein said heat source transfers heat to a working fluid;
   a heat engine which converts at least some thermal energy of the working fluid into mechanical energy;
   a load selected from the group consisting of a rotary generator, a linear alternator, a pump and a compressor, wherein said load is coupled to said heat engine;
   a cooling system which has a cooling fluid that also removes at least some thermal energy from the working fluid; and
   a controller that controls said cooling system to vary a temperature of the cooling fluid as a function of ambient conditions selected from the group consisting of solar intensity, wind velocity, wind direction, air temperature and ground temperature,
   wherein said cooling system includes a motorized variable rate fan that has a speed which is controlled by said controller.

24. An energy conversion system comprising:
   a heat source selected from the group consisting of an isotope heat source, a fuel combustor and a solar connector, wherein said heat source transfers heat to a working fluid;
   a heat engine which converts at least some thermal energy of the working fluid into mechanical energy;
   a load selected from the group consisting of a rotary generator, a linear alternator, a pump and a compressor, wherein said load is coupled to said heat engine;
   a cooling system which has a cooling fluid that also removes at least some thermal energy from the working fluid, wherein said cooling system includes a heat removal reservoir located within a pedestal that supports said solar reflector, said reservoir being adapted to transfer heat to ground; and
   a controller that controls said cooling system to vary a temperature of the cooling fluid as a function of ambient conditions selected from the group consisting of solar intensity, wind velocity, wind direction, air temperature and ground temperature.

25. The system as recited in claim 24, wherein said cooling system includes a heat exchanger connected to said heat engine and said reservoir.

26. The system as recited in claim 24, wherein said controller controls a flow of cooling fluid through said reservoir and said heat exchanger.

27. An energy conversion system comprising:
   a heat source selected from the group consisting of an isotope heat source, a fuel combustor and a solar connector, wherein said heat source transfers heat to a working fluid;
   a heat engine which converts at least some thermal energy of the working fluid into mechanical energy;
   a load selected from the group consisting of a rotary generator, a linear alternator, a pump and a compressor, wherein said load is coupled to said heat engine;
   a cooling system which has a cooling fluid that also removes at least some thermal energy from the working fluid, wherein said cooling system has a form that supports said heat engine, said form having a plurality of heat exchanging pipes that carry the cooling fluid; and a controller that controls said cooling system to vary a temperature of the cooling fluid as a function of ambient conditions selected from the group consisting of solar intensity, wind velocity wind direction, air temperature and ground temperature.

* * * * *